United States Patent
Hamilton et al.

(10) Patent No.: US 7,057,543 B2
(45) Date of Patent: Jun. 6, 2006

(54) LOW POWER METHOD AND INTERFACE FOR GENERATING ANALOG WAVEFORMS

(75) Inventors: Gordon L. Hamilton, North Attleboro, MA (US); Peter E. Allstrom, Attleboro, MA (US)

(73) Assignee: Invensys Systems, Inc., Foxboro, MA (US)

( * ) Notice: Subject to any disclaimer, the term of this patent is extended or adjusted under 35 U.S.C. 154(b) by 0 days.

(21) Appl. No.: 10/834,971

(22) Filed: Apr. 29, 2004

(65) Prior Publication Data

US 2005/0242979 A1 Nov. 3, 2005

(51) Int. Cl.
*H03M 1/66* (2006.01)
*H03K 4/94* (2006.01)
*H04L 27/10* (2006.01)

(52) U.S. Cl. .................. 341/147; 327/130; 375/272
(58) Field of Classification Search ............... 341/152, 341/147, 144; 327/130, 105, 139; 331/57; 375/374, 272, 295, 296, 303, 340; 702/190
See application file for complete search history.

(56) References Cited

U.S. PATENT DOCUMENTS

| | | | | |
|---|---|---|---|---|
| 3,027,515 A | * | 3/1962 | Clark et al. .................. 327/105 |
| 3,125,694 A | * | 3/1964 | Palthe .......................... 327/130 |
| 3,312,837 A | * | 4/1967 | Flynn et al. ................. 327/130 |
| 3,341,716 A | * | 9/1967 | Chilton ........................ 327/139 |
| 3,660,775 A | * | 5/1972 | Nechay ......................... 331/57 |
| 3,772,533 A | * | 11/1973 | Bruckner et al. ............ 327/130 |
| 4,090,138 A | | 5/1978 | Voorman et al. ............. 375/306 |
| 4,461,962 A | | 7/1984 | Hacke et al. ................ 327/175 |
| 4,583,090 A | | 4/1986 | Eden et al. .................. 375/272 |
| 4,682,123 A | | 7/1987 | Loper et al. ................. 332/100 |
| 4,700,364 A | | 10/1987 | Miyazaki et al. ........... 375/303 |
| 5,016,259 A | | 5/1991 | Hershberger ................ 375/276 |
| 5,025,172 A | * | 6/1991 | Carroll et al. ............... 327/130 |
| 5,245,333 A | | 9/1993 | Anderson et al. ......... 340/870.3 |
| 5,337,042 A | | 8/1994 | Hormel et al. ............. 340/3.51 |
| 5,363,405 A | | 11/1994 | Hormel ....................... 375/219 |
| 5,432,817 A | | 7/1995 | Hormel et al. .............. 375/257 |
| 5,473,278 A | * | 12/1995 | Shibata ....................... 327/552 |
| 5,629,959 A | | 5/1997 | Tomesen et al. ............ 375/340 |
| 5,663,728 A | * | 9/1997 | Essenwanger .............. 341/153 |
| 5,757,858 A | | 5/1998 | Black et al. ................. 375/295 |
| 5,812,612 A | | 9/1998 | Saito .......................... 375/272 |
| 5,872,474 A | * | 2/1999 | Kagomiya et al. .......... 327/130 |
| 5,873,054 A | * | 2/1999 | Warburton et al. ......... 702/190 |

(Continued)

*Primary Examiner*—Patrick Wamsley
(74) *Attorney, Agent, or Firm*—Leydig, Voit & Mayer, Ltd

(57) ABSTRACT

A low power analog output circuit is disclosed that utilizes a low pass filter driven by a bit stream to render a wave-shaped output signal based upon a raw digital data signal. The analog output circuit includes sequential bit pattern selection logic that receives as an input, the raw digital data signal. The analog output circuit also includes a bit pattern storage that specifies bit stream sequences that are selected in accordance with control signals generated by the state machine based upon its current state and the current raw digital data signal. The analog output circuit includes an output stage driven by a digital input signal corresponding to values provided by a bit stream sequence selected from the bit pattern storage. The output stage comprises a low pass filter circuit having an effective time constant that is greater than a hold period associated with a single bit of the bit stream sequence that drives the digital input signal.

26 Claims, 5 Drawing Sheets

U.S. PATENT DOCUMENTS 5,943,379 A * 8/1999 Wong et al. .................. 375/374
6,127,885 A   10/2000 Colangelo .................... 330/10
6,853,724 B1 * 2/2005 Wang .................... 379/387.02
2002/0150156 A1  10/2002 Calvin

* cited by examiner

| | CURRENT State | Tx Enable INPUT Level | FSK Signal Changed? | RAMP Complete? (Status Var.) | CURRENT OUTPUT (of Bit Sequence Select) and NEXT STATE |
|---|---|---|---|---|---|
| 1 | Don't Care | LOW | Don't Care | Don't Care | NEUTRAL |
| 2 | Neutral | HIGH | Don't Care | N/A | RAMP (1/2 sequence) |
| 3 | RAMP | HIGH | N/A | NO | RAMP |
| 4 | RAMP | HIGH | N/A | YES | IDLE |
| 5 | IDLE | HIGH | YES | N/A | RAMP |
| 6 | IDLE | HIGH | NO | N/A | IDLE |

FIG. 4b

LOW POWER METHOD AND INTERFACE FOR GENERATING ANALOG WAVEFORMS

TECHNICAL FIELD

This invention generally relates to waveform transmitters, and more particularly, to process variable transmitters that are utilized to transmit a process variable value, in the form of a waveform, to another process control component of an industrial process control system.

BACKGROUND

A variety of signal transmitting devices include outputs that are, for the most part, digital, but also include an analog aspect due to particular signal wave shape requirements. An example of such a transmitting device is a process variable transmitter. Process variable transmitters are used in a variety of industrial applications, and provide an electrical output signal corresponding to a sensed condition signal generated by a process variable (e.g., temperature, pressure, pH, etc.) sensor. The electrical output signal of the sensor is translated into a corresponding measurement value for the particular detected environmental variable type. The corresponding measurement value, in turn, is converted into an output signal that is transmitted to any of a variety of recipients, including a process controller. The process controller performs some action regarding the received output signal. At one point in time, such output signal was provided almost exclusively in the form of a 4–20 milliamp current signal. However, today digital communication standards exist and have substantially grown in use within industrial process control applications. It is now common for process control data, including process state information provided by process variable transmitters, to be transmitted in both a digital form superimposed as an AC signal on the 4–20 milliamp DC signal.

Digital signals are generally considered to have less exacting standards with regard to wave shape. The data exists within steady-state signal levels, frequencies, and/or phases. However, rather than requiring an exact value, each value must fall within specified ranges around signal levels/frequencies/phases. For example binary digital signals (having only two possible logical values) have defined high and low signal levels—with a buffer region separating these two levels. As a result, simple, inexpensive digital output circuits are known that provide minimized rise and fall times.

However, if not properly formed, digital signals can become a source of interference. One such form of interference that arises when data is output in the form of a square wave is cross talk. Such problem is well documented in the prior art. One way to suppress cross talk interference is to wave shape the output to reduce/eliminate abrupt signal level rate/slope changes—which increase the incidence of cross talk. If several wires are bundled together in close proximity to one another, interference/cross-talk becomes a substantial digital signal quality issue. As a result, even digital signal communications standards include specifications for rising/falling edges to limit interference/cross-talk and ensure proper operation of physical communication links embodying the communications standards. In such instances, the digital data signal waveforms actually have analog aspects that reduce the level of interference (e.g., cross talk) generated by the digital signal waveforms. By way of example, the transition points of a square wave are controlled (e.g. curved) to reduce/eliminate sharp transitions.

Transmitting control and data information between components of an industrial process control system is governed by communication protocols. Such communication protocols specify standards for transmitting waveforms to ensure proper operation of the devices that communicate via the protocols, and more particularly, ensure proper interpretation of received signal transmissions. By way of example, a well-known communication protocol in the industrial process control industry, known as the HART (Highway Addressable Remote Transducer) protocol/communications standard, includes a physical layer specification requiring a particular shape for the rising and falling edges of a waveform. In particular, the HART protocol requires a linear ramp (up/down), having a specified duration, between high and low physical signal levels.

A simple resistor/capacitor output stage, driven by a simple high or low input square wave signal, is inappropriate for HART devices. Such output stage generates an exponential rise and fall that does not meet signal level transition characteristics (i.e., approximating a linear ramp having particular rise and fall times) required by the HART protocol physical layer specification. In such instances complex analog circuitry, such as one or more current sources coupled to one or more resistor/capacitor filter stages, is required to meet the exacting signal transition specifications of the HART protocol. Yet another potential technique for generating an analog output of arbitrary shape involves using a digital-to-analog converter that receives a stream of digital values controlling an analog output of a specific shape. The analog output of the digital-to-analog converter provides an output that closely follows the present digital input code in order to produce both steady state signals as well as shape signal transitions between the steady states.

The above example, addressing requirements of the HART protocol, is only one of many potential instances where a largely digital communications protocol incorporates analog signal standards—such as for example requiring a time-varying output signal to conform to a specific shape—that, in-turn, requires incorporation of output circuitry capable of producing a signal having particular wave shape properties.

SUMMARY OF THE INVENTION

The present invention is directed to a method and circuit arrangement for providing controlled waveform shapes through an output circuit including a low pass filter/output stage having an effective time-constant that is greater than a hold period for each bit of a bit stream-driven input signal that drives the output stage low pass filter circuit.

In particular, the present invention comprises a low power analog output circuit, and a method, for rendering wave-shaped signals based upon digital signal input. The analog output circuit includes a raw digital data signal that is received by the analog output circuit which forms the basis for the waveshaped output signal. The analog output circuit also includes sequential bit pattern selection logic that receives as an input, the raw digital data signal. In a particular embodiment, such logic is embodied within a state machine.

The analog output circuit also includes a bit pattern storage. The bit pattern storage specifies bit stream sequences. The bit stream sequences are selected in accordance with control signals generated by the state machine based upon its current state and the current raw digital data signal.

The analog output circuit further comprises an output stage. The output stage is driven by a digital input signal corresponding to values provided by a bit stream sequence selected from the bit pattern storage. The output stage comprises a low pass filter circuit having an effective time constant that is greater than a (hold) period for a single bit of the bit stream sequence that drives the digital input signal to the output stage. The response characteristic of the output stage enables waveshaping of the raw digital data signal into a variety of forms. By way of example, a square wave signal (raw input) can be transformed into HART compliant trapezoidal waves having substantially linear ramp up/down transitions between high/low idle levels.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 4b is a truth table corresponding to the state diagram depicted in FIG. 4a.

DETAILED DESCRIPTION OF THE DRAWINGS

Figure 1:
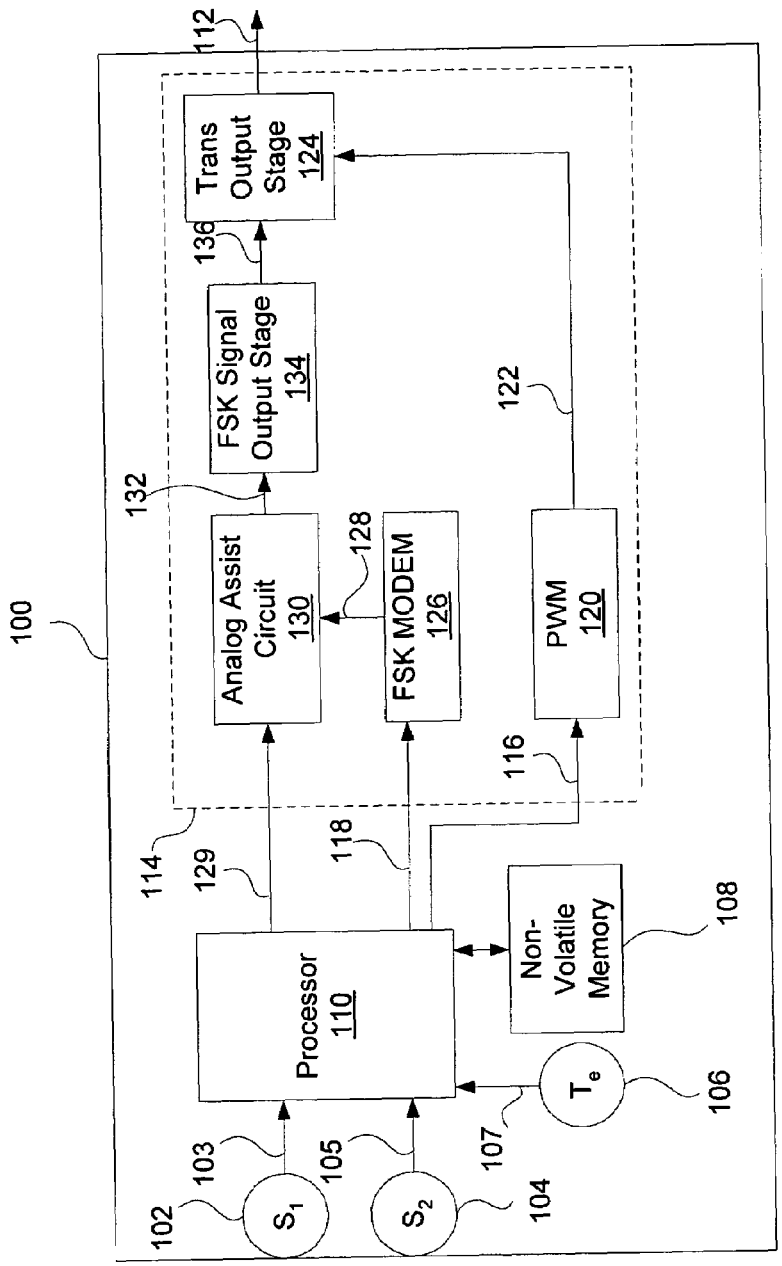
FIG. 1 is a schematic diagram including a set of primary functional components within an exemplary process variable transmitter including an output signal generator stage embodying the present invention.

Turning to the drawings, and in particular FIG. 1, the invention, in a particular embodiment, is incorporated within a process variable transmitter 100. The process variable transmitter 100 includes a first process variable sensor $S_1$ 102, a second process variable sensor $S_2$ 104 and an electronics temperature sensor $T_e$ 106. In the exemplary embodiment, the electronics temperature sensor 106 provides a measure of the ambient temperature in the vicinity of the electronics (as opposed to the process variable sensors 102 and 104) of the process variable transmitter 100. In addition, the transmitter 100 includes a processor 110 having access to a non-volatile memory 108 and inputs for receiving input signals from the sensors 102, 104 and 106. Such input signals include, in various exemplary embodiments of the invention, signals representative of sensed process variable values of various process variable types (temperature, pressure, pH, etc.). As those skilled in the art will appreciate in view of the disclosure herein, the present invention is potentially applicable to a wide variety of signal transmitter types, including process variable transmitters for sensing and transmitting a signal representative of a sensed physical condition. The operation of the processor 110 is governed by program instructions and data stored in the non-volatile memory 108. It is noted that the non-volatile memory 108 can comprise multiple components including both programmable (e.g., EEPROM or FLASH) and non-programmable (e.g., read-only memory) components. Calculated output values are thereafter transmitted to an output stage 114 that performs a number of tasks including, by way of example, an ASIC for performing, among other things, temperature compensation based upon at least a current sensed temperature.

As those skilled in the art will readily appreciate in view of the illustrative embodiments, there are a variety of ways in which to pass the analog signals, corresponding to sensed physical conditions, from sensors, such as the sensors 102, 104 and 106, to the processor 110. The inputs of the processor 110 coupled to the sensors 102, 104 and 106, in the illustrative embodiment of the invention, comprise analog signal inputs. As depicted in FIG. 1, the analog signals on dedicated analog signal lines 103, 105 and 107 are coupled to corresponding analog signal inputs of the processor 110. The signals received by the processor 110 via lines 103, 105 and 107 (that may comprise one or more physical lines) are passed to one or more analog-to-digital converters incorporated into the processor 110. However, in alternative embodiments of the invention, one or more of the analog signals provided by the sensors 102, 104, and 106 are passed to an external multiplexing circuit that, in turn routes a selected one of the analog signals to an analog input on the processor 110. In yet another embodiment of the invention, the analog signals from the sensors 102, 104 and 106 are routed to an external analog-to-digital converter having a digital output coupled to a digital input of the processor 110. The digital output of the external analog-to-digital converter is read/registered by the processor 110 via a digital input.

The processor 110, in the illustrative embodiment, processes digitized analog input signals from the sensors 102, 104 and 106, according to instructions and data provided by the non-volatile memory 108, to render a digital process variable value. Such processing includes digital compensation of input process variable values in view of sensed operating conditions and previously established calibration and scaling parameter values. In an exemplary process variable transmitter 100, the first process sensor 102 comprises a pressure sensor, the second process sensor 104 comprises a temperature sensor (measuring the temperature in the vicinity of the (pressure) sensor 102), and the transmitter 100 renders a calibrated process pressure measurement signal on line 112 (comprising one or more lines). Other varieties of process variable transmitters are well known in the art. It is further noted that the present invention is not limited to process variable transmitters as the signal conditioning/shaping circuitry described herein are potentially applicable to a variety of transmitters, including a broad variety of process variable transmitters that transmit an output signal in a variety of wave shapes (e.g., sinusoidal, saw tooth, etc.) based upon a variety of transmitter communications protocols.

In the illustrative embodiment of the invention, the transmitter 100 transmits process variable values on a transmitter output, represented by line 112, that carries a frequency-shift keying (FSK) AC signal (according to the HART communications protocol) superimposed upon a 4–20 milliamp DC signal. To facilitate generating the combined signal, the processor 110 issues two separate digital signals on line 116 and line 118 (potentially comprising multiple lines) for driving the DC and AC components of the output signal on line 112. The data signal, transmitted via line 116, drives a PWM signal generator 120. The PWM signal generator 120 transmits a periodically repeating PWM signal having a duty cycle determined by the digital data received via line 116 (as well as output stage temperature compensation performed by an application-specific integrated circuit). The PWM signal is transmitted via line 122 to a low pass filter within the transmitter output stage 124. The filtered voltage signal is thereafter converted, within the output stage 124, to a current signal. The PWM signal is represented in the DC component of the output signal on line 112.

Digital data is transmitted via line 118 to an FSK modem 126. The FSK modem 126 converts the digital data received via line 118 into an FSK signal. In an embodiment of the invention, the FSK modem 126 transmits the FSK signal in the form of a square wave. However, the transmitter 100, in accordance with HART protocol specifications, must render an AC signal having signal transitions, between high and low logic levels, that are substantially linear, and furthermore such signal transitions must have a rise/fall time between specific maximum/minimum duration limits. For this reason, the FSK modem 126 transmits the square wave via line 128 to an analog assist circuit 130. It is noted that the illustrative example uses the HART transmission standard. However, the invention disclosed herein is applicable to many circumstances where particular wave shaping, or wave creation, is desired.

In an embodiment of the invention, the analog assist circuit 130 receives a square wave input via line 128. Lines 129 include a clock signal controlling a bit stream transmission rate of the analog assist circuit 130 and a transmit enable signal provided by the processor 110. The analog assist circuit 130 renders a bit stream-driven signal on line 132 according to a designated signal generation pattern corresponding to the input square wave signal.

In the illustrative embodiment, an FSK output stage 134 receives the bit stream-driven signal on line 132. The response of the FSK output stage 134, including low pass filter circuit elements (e.g., an resistor/capacitor circuit combination), to changes in the input signal value on line 132 is characterized, at least in part, by an effective time constant. The effective time constant of the FSK output stage 134 corresponds to the time for the circuit to decay from a maximum value to approximately 40 percent (i.e., $e^{-1}$) of its maximum value when an input signal drops from a steady-state high output value to zero. In the case of a single stage resistor-capacitor low pass filter the effective time constant value, referred to as Tau, is the product of the resistance and the capacitance of a serially connected resistor and capacitor.

Figure 1A:
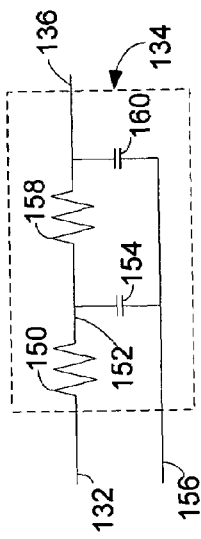
FIG. 1a is a schematic diagram of an exemplary FSK signal output stage.

In accordance with an embodiment of the present invention, the hold period (e.g., 4 microseconds in the example provided in FIG. 5) associated with a single bit within the bit stream that drives the input signal transmitted on line 132 is smaller, and in fact multiple times (e.g., about 2, 5, 10 times) smaller, than the effective time constant of the FSK output stage 134 depicted, by way of example, in FIG. 1a.

Such relationship between the maximum modulation rate (hold period) of the bit stream that drives the signal on line 132 and the low-pass filter response of the FSK output stage 134 facilitates shaping of a waveform transmitted on line 136 by careful selection of a pattern for a sequence of bits within a bit stream that drives a signal transmitted by the analog assist circuit 130 on line 132 to the FSK output stage 134. In the illustrative embodiment of the invention, the described relationship enables the analog assist circuit 130 and FSK signal output stage 134 to render, from a square wave input on line 128, a trapezoidal wave on line 136 having substantially linear ramped transitions between high and low signal levels that meet wave shape requirements set forth in the HART protocol. An exemplary arrangement of components within the analog assist circuit 130 are provided herein below with reference to FIG. 3. The transmitter output stage 124 combines/superimposes, in well known manner, the AC signal component from line 136 with the DC signal component provided by line 122 from the PWM signal generator 120 to render the output signal on line 112.

Turning to FIG. 1a, an exemplary FSK output stage 134, a low pass filter, is depicted in greater detail. In this particular example, a two-stage, cascaded RC circuit provides the desired response to render a wave-shaped output based upon an input square wave signal. In the exemplary embodiment the FSK output stage 134 comprises a first resistor 150 coupled to line 132 from the analog assist circuit 130. The first resistor 150 is also attached to line 152. A first capacitor 154 is also connected to line 152. The other terminal of the capacitor 154 is attached to line 156 that is signal ground (or, alternatively an appropriate transmit enable signal). Resistor 150 and capacitor 154 comprise a first stage of the illustrative two-stage low pass filter. The first stage of the low pass filter handles the full range of input voltage from line 132. A second resistor 158 is coupled to line 136 that passes a signal from the FSK output stage 134 to the transmitter output stage 124. A second capacitor 160 is also connected to line 136. The other terminal of the capacitor 160 is attached to line 156. Resistor 158 and capacitor 160 comprise the second stage of the two-stage low pass filter. In an embodiment of the invention, the second stage of the low pass filter performs the function of smoothing out ripples in the output of the first stage and can therefore have a time constant that is smaller than the first stage's time constant. Adding more stages potentially adds further smoothing, but also delays slewing of the output signal on line 136.

Having established that the effective time constant of the low pass filter incorporated within the FSK output stage 134 is greater than the bit transmission hold period of the analog assist circuit 130, it is noted that increasing the difference between the low pass filter constant and the bit transmission period results in decreased signal ripple in the output stage 134. However, at some point, increasing the ratio of the effective time constant of the low pass filter to the bit transmission period, by increasing the effective time constant of the low pass filter, eventually yields an unacceptable signal response at the output of the FSK output stage 134 (e.g., at a point where the time constant is too high for the FSK output stage 134 to accurately reproduce the intended output data or meet signal shaping requirements). Thus, the selection of time constant(s) for the output stage 134, while limited by certain functional and signal quality requirements, can vary greatly based upon the particular environment/application within which the output stage 134 operates. Thus in summary, in exemplary embodiments of the invention, the effective time constant of the FSK output stage 134, in addition to being multiple times greater than the hold time for a single bit, is also sufficiently small to facilitate proper slewing that enables transitioning between beginning and ending output levels within a maximum allowed time period.

Figure 5:
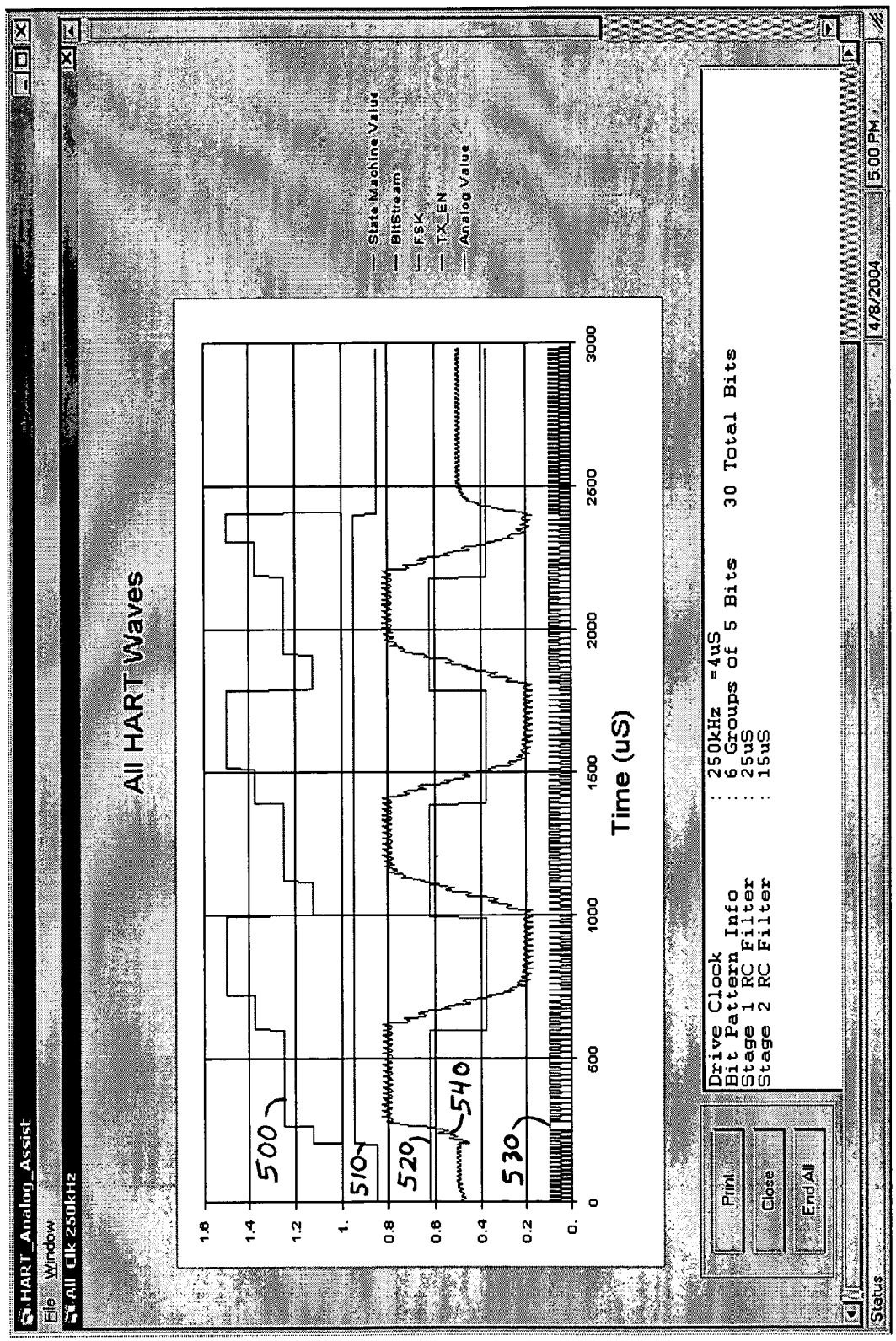
FIG. 5 is an exemplary set of waveforms associated with a variation of the circuit depicted in FIG. 3.

In an embodiment of the invention, the bits are transmitted on line 132 at a rate of 128 khz, and thus the time duration for transmitting a single bit by the analog assist circuit 130 is 8 microseconds (see also, FIG. 5 where the rate is 256 kHz corresponding to one bit every four microseconds). Furthermore, in an embodiment of the invention, the first and second resistors 150 and 158 are on the order of 1 kohm and 1 Mohm, respectively. The first and second capacitors 154 and 160 are on the order of 50 nano-farads and 10 pico-farads respectively. In this example, the time constant of the first stage (resistance times capacitance) is 50 microseconds (several times larger than the bit transmission period of 8 microseconds). The second stage has a time constant (10 microseconds) that is about one fifth the time constant of the first stage (50 microseconds). However, the particular values for the clock rate, components of the low pass filter embodied within the FSK output stage 134, as well as the arrangement of the components themselves, are modified in various embodiments of the present invention. For example, in an alternative HART (166 microsecond nominal slew—high/low transition period) transmitter arrangement, the clock rate is 500 kHz, the resistors 150 and 158 are 1000 ohms, and the capacitors 154 and 160 are each 20 nano farads. Selection of such components and values will be largely driven by signal shape, quality, timing requirements. Such factors are discussed further herein below.

A number of generalizations can be applied to the relationship between the modulation rate (hold period) of the bit stream that drives input via line 132 and the effective (e.g., RC) time constant of the low pass filter circuitry that makes up the FSK output stage 134. In general, the invention embodies the concept of using a non-ideal, yet simple and inexpensive, low pass filter circuit that is driven by a bit stream. The time constant of the low pass filter is sufficiently large that its output, while bearing no resemblance to the input bit stream, produces controlled transitions that make up waveform segments. The waveform segments are combined to render a desired waveform.

The input waveform on line 132 is generally arbitrary, and it is made up of replicated parts. However, the desired output waveform on line 136 can be generally described as a concatenation of waveform pieces. Thus, while the output on line 136 may not be periodic, or even predictable, portions of the waveform are generally being re-used. In cases where the number of individual waveform pieces is not reasonably small, other means of moving from the digital environment to the analog environment, e.g., high speed D/A converters, might be preferred.

Another generalization concerning the FSK output stage 134 concerns the choice of circuitry for providing appropriate RC time constant smoothing with regard to the input signal on line 132. Filtering the bit stream-driven square wave input on line 132, in the illustrative embodiment, incorporates at least two cascaded RC stages. A single low pass stage within the FSK output stage 134, driven by a digital input that has drive up, drive down, and float states, produces only ramp up, ramp down and hold states. Including additional low pass stages within the FSK output stage 134 facilitates significant smoothing, and thus shaping, of the output on line 136. In an alternative embodiment, the FSK output stage 134 comprises a single low pass filter stage combined with known digital integrated circuits having drive high, drive low, and tri-state capabilities to produce ramp up, ramp down, and hold waveform segments. However, such circuitry is likely unacceptable for some uses.

The low pass filter circuitry within the FSK output stage 134 primarily passes (via line 136) the average or "DC" portion of the input signal on line 132. This characteristic of the FSK output stage 134 (i.e., a slow response characteristic in comparison to the maximum modulation rate of the bit stream that drives the input signal on line 132) contrasts with an alternative low pass circuit arrangement (not used in the present invention) where the fundamental frequency and perhaps some signals with higher bandwidth are passed/transmitted by the low pass circuit with reasonable fidelity, and only higher frequency components of an input signal are attenuated. The low pass filter circuitry within the FSK output stage 134 thus allows the filters to be simple and insensitive to interactions between stages. For example, buffering or impedance scaling are typically not required. It is noted that the output waveform on line 136 described as "DC" is only DC relative to the breakpoint of the low pass filter circuitry within the FSK output stage 134 that removes the bit pattern of the input signal on line 132. In fact, in many instances the output signal on line 136 is AC coupled into the output of a transmitter or into some other portion of industrial process control equipment. Furthermore, because the overall breakpoint frequency of the low pass filters within the output stage 134 is typically significantly below the maximum modulation rate of the bit stream that drives the input signal on line 132, a variety of waveforms are potentially specified by designating a variety of bit patterns that drive the signal transmitted to the FSK output stage 134 via line 132.

Another aspect of operating the FSK output stage 134 is the effective modulation rate of the bit stream that drives the signal on line 132. The effective modulation rate is determined by the frequency with which bits are processed as output on line 132 and the rate at which the bit values themselves change. For example, 00001111 and 01010101 represent a string of eight bits that drive the signal on line 132. Both have the same ratio of 1's and 0's, but the latter bit string specifies a sequence that changes four times as often as the former bit string—and thus, the circuitry of the FSK output stage 134 is better able to filter input to render a desired analog signal (a steady mid-level output) if the latter bit sequence is used. Viewed differently, a higher frequency clock may be required to properly handle (provide a sufficiently stable/unchanging output corresponding to) the former bit sequence than the latter bit sequence. In embodiments of the present invention where a lower frequency clock rate is desired to reduce power consumption, the latter bit sequence is generally preferred to the former bit sequence.

Yet another aspect of operating the FSK output stage 134 is the DC offset and symmetry of the desired output signal on line 136. For target waveforms that are symmetrical about an average value the drives and thresholds typically will be symmetrical. E.g. a trapezoid might be biased at 50% (the neutral state if such state exists) and slew, perhaps using 100% drive, to a high state of 80% and reverse the process using up to 0% drive and a low state of 20%. Asymmetrical waveforms, e.g. a saw tooth output waveform potentially requires moving thresholds relative to an average to obtain the ability to develop asymmetrical slew rates. It is also noted that modifications to embodiments of the FSK output stage 134 and the bit stream-driven input on line 132, permit the basic concepts relating to the response of the FSK output stage 134 disclosed herein to be applied to a range of bit stream maximum modulation frequencies and wave shapes. The output circuit architecture disclosed herein is potentially used to generate a variety of different waveforms by simply changing the bit patterns driving the input signal on line 132. For example, trapezoid, sawtooth, and sine wave waveforms are generated at, or near, the same frequency by merely changing the bit sequences that drive the FSK output stage 134. In practice, although fast clocks and longer/more elaborate bit sequence patterns will provide better approximations to target waveforms, developing/designing a particular output wave on line 136 in a power-limited circuit generally incorporates a tradeoff resulting in using a slower clock and using shorter patterns to reduce power dissipation and simplify implementation.

Figure 2:
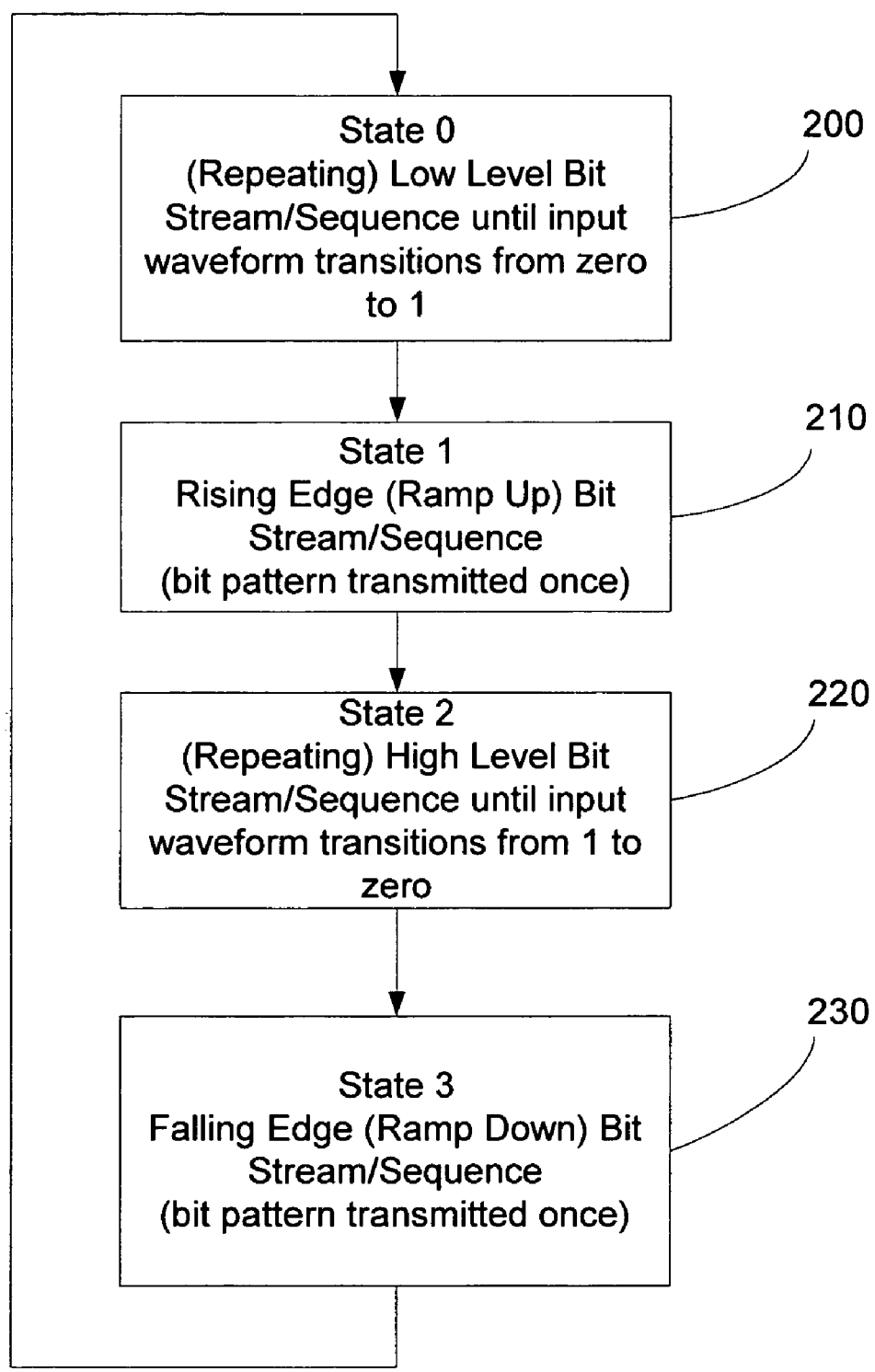
FIG. 2 is a basic sequence of states through which an exemplary state machine passes in accordance with an exemplary embodiment of the present invention.

Having described a transmitter 100 that incorporates the present invention to facilitate transmitting a trapezoidal waveform conforming to signal standards specified by the HART protocol, attention is directed to FIG. 2 that summarizes a progression of states corresponding to a simple, non-neutral, signal creation sequence—such as one for producing a signal comprising a sequence of trapezoidal waves. Taking as a starting point signal logic level "0", during step 200, a state machine within the analog assist circuit 130 resides within State 0. While within State 0, a low level pattern is transmitted by the analog assist circuit 130 on line 132 to render a low logic level output on line 136 from the FSK signal output stage 134. As will be explained herein below, the low level pattern does not consist of a single logic level value (i.e., it arises from a combination of high and low bit values). In an embodiment of the invention, the analog assist circuit 130 remains within, and repeats the low level pattern corresponding to, State 0 until the signal on line 128 transitions from logic 0 to logic 1. In response to the positive transition, control passes from step 200 to step 210 that corresponds to State 1 (rising edge of a waveform).

During step 210, at State 1 a rising edge pattern is transmitted by the analog assist circuit 130 on line 132 to render a rising edge wave output on line 136. The State 1 rising edge pattern, comprising a combination of high and low bit values, is transmitted only once to create a rising edge for an analog output signal. After completing transmitting the rising edge pattern corresponding to State 1, control passes to step 220 that corresponds to State 2 (high level of a waveform).

During step 220, at State 2 a high level pattern is transmitted by the analog assist circuit 130 on line 132 to render a high logic level output on line 136 from the FSK signal output stage 134. As will be explained herein below, the high level pattern does not consist of a single logic level (i.e., it arises from a combination of high and low bit values). In an embodiment of the invention, the analog assist circuit 130 remains within, and repeats transmitting a high level pattern corresponding to, State 2 until the signal on line 128 transitions from logic 1 to logic 0. In response to the negative input signal transition, control passes from step 220 to step 230 that corresponds to State 3 (falling edge of a waveform).

During step 230, at State 3 a falling edge pattern is transmitted by the analog assist circuit 130 on line 132 to render falling edge wave output on line 136 resulting in a return to the low output level associated with State 0 (Step 200). The State 3 falling edge pattern, comprising a combination of high and low bit values, is transmitted only once. After completing transmitting the falling edge bit pattern corresponding to State 3, control returns to step 200 that corresponds to State 0 described herein above.

It is noted that the bit modulation rate (i.e., the rate at which a bit stream driving the output on line 132 is consumed by the analog assist circuit 130 to drive the signal on line 132) and the response characteristic of the FSK signal output stage 134 (depicted, by way of example in FIG. 1a) determine the extent to which any given output wave can be controlled (e.g., slope control, ripple, etc.). For any given response characteristic for the output stage 134, a clock rate and bit sequences are determined/designated for rendering a set of output signal waveshape segments corresponding to, for example, stable high/low signal levels as well as rising/falling transitions between the high/low signal levels.

Figure 3:
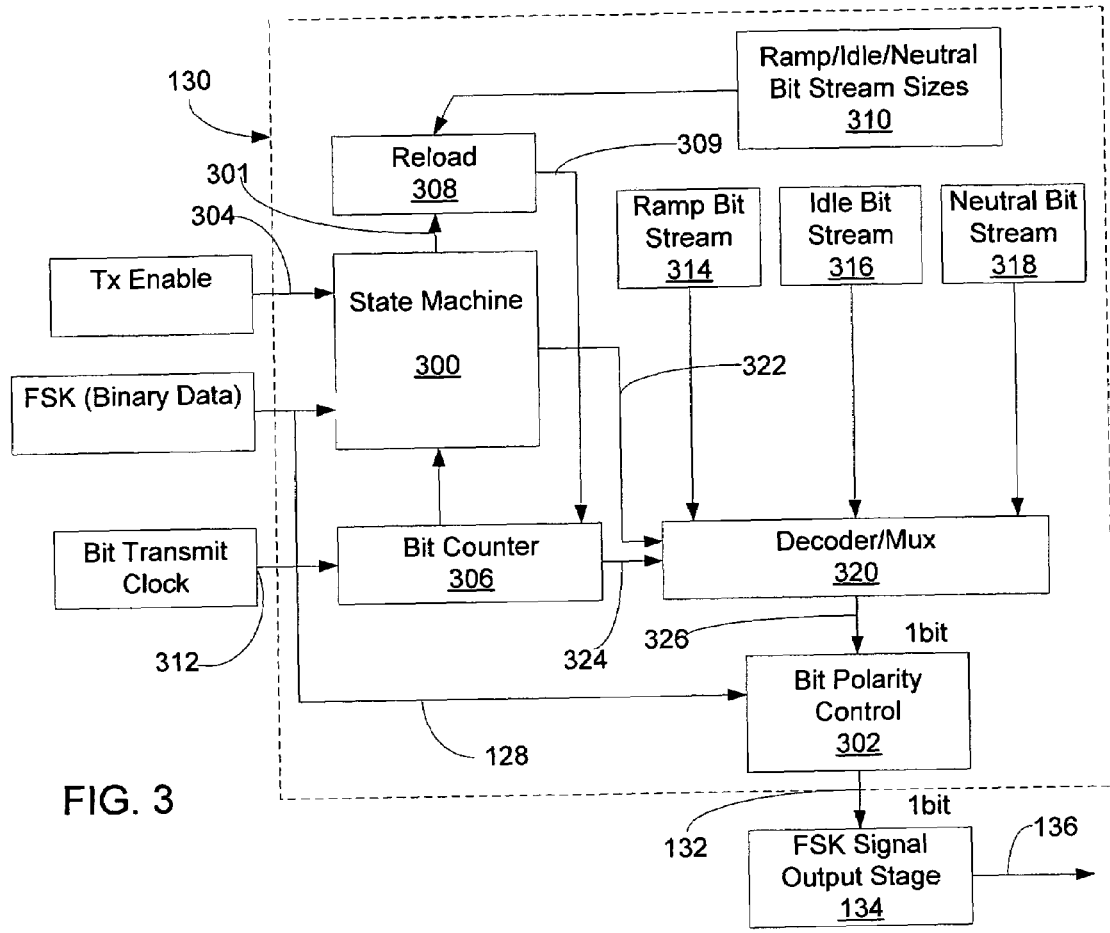
FIG. 3 is a schematic diagram of an analog assist circuit embodying the present invention.

Turning to FIG. 3, an exemplary circuit is depicted for the analog assist circuit 130. In the illustrative example, low and high level bit patterns are complements of one another, as are the up and down transition bit patterns. As such a single bit pattern is provided for each complementary pair (and a third bit pattern is provided for a neutral state) and the FSK input signal on line 128 determines whether the stored bits are complimented at a bit polarity control 302 (e.g., an XOR logic gate) prior to their transmission on line 132. In other embodiments, the full set of bit patterns are stored and the polarity control 302 is not needed.

A state machine 300 within analog assist circuit 130 controls the selection of bit sequences passed via line 132 to the FSK signal output stage 134. The state machine 300 receives a square wave data signal rendered by the FSK Modem 126 via line 128. The state machine 300 also receives a transmit enable signal via line 304 from the processor 110. When enabled, the state machine 300 causes selection of a particular bit sequence based upon a currently selected state. An exemplary state machine, for generating a trapezoidal waveform according to the HART protocol, is described herein below with reference to FIGS. 4a and 4b. In various embodiments of the invention, the state machine 300 is carried out via hardwired circuitry, firmware, and/or software.

The state machine 300, through state/index line 301, drives loading (via line 309) a bit counter 306 through a reload circuit 308 that accesses a set of registers 310 for storing the length of bit stream sequences for ramp, idle, and neutral bit patterns. In alternative embodiments, such bit patterns correspond to segments of differing wave shapes (e.g., sinusoidal, saw tooth, etc.) corresponding to differing transmission protocol standards. The value passed on line 301, indicating a particular state of the state machine 300, designates a particular one of the bit stream sizes maintained in the set of registers 310. Once loaded, the bit counter 306, under timing control provided by a bit transmission clock signal from the processor 110 via line 312, counts down the bits within a bit sequence associated with a current state of the state machine 300. When the count value is exhausted, the state machine 300 executes logic to determine a next state of operation based upon a set of input variables.

The state value of the state machine drives an offset value transmitted via line 322 that indexes/selects one of the three different sources of bit steam data maintained by: a ramp (rising/falling edge) pattern bit sequence 314, an idle (high/low) pattern bit sequence 316, and a neutral pattern bit sequence 318. In an embodiment of the invention, the ramp pattern bit sequence 314 stores up to 88 bits, the idle pattern bit sequence 316 holds up to 16 bits, and the neutral pattern bit sequence 318 holds, by way of example, a bit sequence defining a 50% duty cycle (an equal number of "1" and "0" bits). The number of bits within the stored neutral pattern bit sequence 318 is not of primary concern. In an embodiment of the invention, the bits alternate between "1" and "0" (and specify a repeating two-bit pattern). In other embodiments, two or more same bit values are placed adjacent to one another (e.g., "11" then "00"). To limit re-loading, the neutral pattern bit sequence 318 (or any of the above-described bit sequences) holds multiple repetitions of a basic sequence. In various embodiments of the invention the number of bits and content of each of the three bit sequences is: hardwired, modifiable via software, and/or modified via firmware.

Furthermore, the pattern bit sequences are defined in a variety of ways in accordance with various embodiments of the invention. While the above-described examples describe stored bit sequences. In other embodiments of the invention, the bit sequences are defined by way of mathematical equations, desired steady-state signal levels, etc. Such "encoded" sequences are processed to render the bit streams that drive the signal transmitted via line 132 to the FSK Signal Output Stage 134 in the illustrative embodiment of the invention.

Furthermore, in an embodiment of the invention, each bit position in the bit sequences 314, 316 and 318 is coupled via a dedicated line to a corresponding input in a decoder/multiplexer 320 that selects one of the input bits according to an offset value provided by the state machine 300 and a current value of the bit counter 306 via lines 322 and 324, respectively. Alternatively, shared lines connect the data within the bit sequences 314, 316 and 318 to inputs of the decoder/MUX 320. The selected bit is passed via line 326 to the bit polarity control 302. Based upon the level of the input signal on line 128 from the FSK modem 126, the resulting output signal on line 132 is either the same as, or complement of, the input signal on line 326. As mentioned previously above, the output bit sequence on line 132 is passed to the FSK signal output stage 134 having a response characteristic that is slower than the bit transmission rate (based upon the clock signal on line 312). Thus, in an exemplary embodiment of the present invention, a re-shaped FSK signal is output on line 136.

Figure 4A:
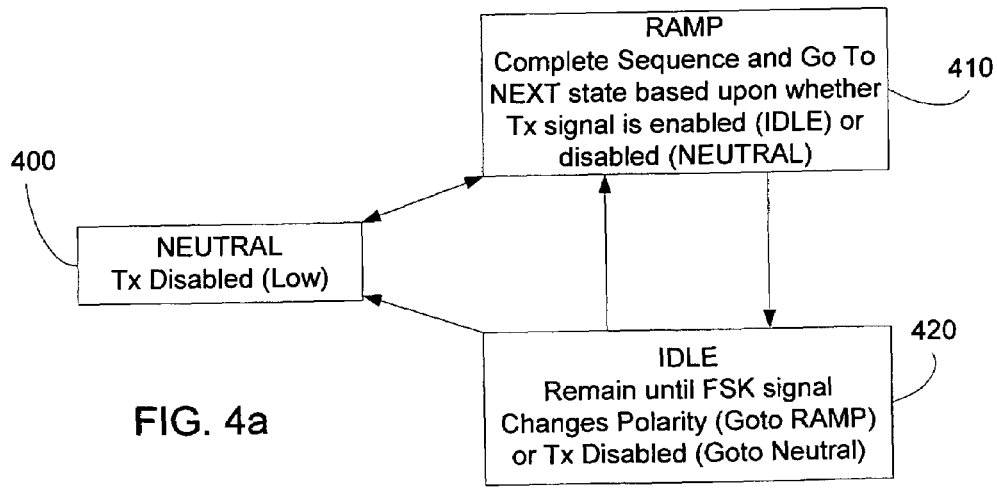
FIG. 4a is a state diagram summarizing the sequential logic incorporated within the state machine of FIG. 3.

Turning now to FIGS. 4a and 4b the operation of an exemplary embodiment of the state machine 300 is summarized. As shown by line 1 of the state table in FIG. 4b, in the exemplary embodiment, the state machine 300 enters (from any of the other states) and stays within a neutral state 400 any time the transmit enable signal on line 304 is low. As shown in line 2 of the state table, the state machine 300 transitions from the neutral state 400 to a ramp state 410 when the transmit enable signal goes high. However, since the transition is only part of a full signal transition, less than a full bit sequence (e.g., the latter half) is transmitted by loading only half the ramp count size into the counter 306. Once in the ramp state 410, in accordance with line 3, the ramp continues until the bit counter reaches zero. Referring now to line 4, when the ramp bit sequence completes (i.e., the counter 306 has reached a minimum value indicating all the bits have been transmitted for the loaded bit sequence), the state machine 300 transitions from the ramp state 410 to an idle state 420 (unless the transmit enable signal on line 304 goes low—causing a transition to the neutral state 400).

Lines 5 and 6 of the state table depicted in FIG. 4b are directed to the operation of the state machine while in the idle state 420. In general, while within the idle (high/low) state 420, the state machine 300 will repeat the idle bit sequence until the FSK signal changes. In contrast to the ramp state 410, the idle state 420 is interruptible. Thus, if the logic level of the FSK signal on line 128 changes before the idle bit sequence completes (and the transmit enable on line 304 is still in the high/active state), then the state machine 300 transitions to the ramp state 410 and the counter 306 is reloaded with the bit count for the ramp pattern bit sequence.

Having described the structure and operation of an exemplary output circuit embodying the present invention, attention is directed to FIG. 5 that provides an exemplary set of waveforms depicting bit sequences and corresponding circuit outputs in an embodiment of the invention wherein the output circuit is programmed to render a generally trapezoidal (HART protocol-compliant) waveform based upon a generally square wave input waveform provided by the FSK modem 126. However, before describing the waveforms a number of design considerations will be described. First, in the illustrative embodiment, the neutral waveform bit stream comprises alternating high/low bits at an equal ratio—resulting in an output that is approximately midway between high and low signal levels. Furthermore, neither the high nor the low idle signal levels correspond to all ones or zeroes within the bit steam. Instead, intermediate high and low levels (e.g., 80 percent and 20 percent duty cycles) are chosen. For example, in an embodiment of the invention, a repeating bit sequence of "11110" is designated for the repeating pattern used while the state machine is within the idle state 420.

Using intermediate high and low signal levels to represent the idle state enables controlling the slope of transitions between high and low signal levels while in the ramp state 410 by over/under driving the output stage 134. Careful over/under driving the output stage 134 during the ramp state counters non-linear response behavior of resistor-capacitor circuits and facilitates creating nearly linear ramped signal transitions while within the ramp state 410. By way of example, in the illustrative example for a HART protocol transmitter, a sequence of 110 110 110 111 111 111 is used to drive resistor/capacitor (RC) circuitry within the output stage 134. In this exemplary sequence, the initial output is "under driven" by injecting a null bit for every third bit during the first half of the bit sequence. However, the second half of the bit sequence (all ones) is "over driven" since, during the idle state, every fifth bit is null.

The above-described bit sequence, including under driving and over driving bit pattern sub-segments, has the effect of complementing the non-linear exponential decay of an RC circuit thereby generating more linear high/low transitions by the resistor/capacitor sub-circuits within the output stage 134—as opposed to an exponentially decaying signal that is characteristic of an RC circuit driven by a consistently low or high input. More specifically, the output stage 134 is initially under driven to compensate for the relatively steep slope that is characteristic of RC circuits. However, as the RC circuit approaches its maximum/minimum voltage, the output stage is over driven to compensate for the decaying slope. Thus, in accordance with an embodiment of the present invention, an input square waveform is transformed to a substantially trapezoidal waveform, using relatively low power circuitry (due in-part to a lower clock signal driving the output stage) in comparison to output circuitry that uses a standard D/A converter to generate the output waveform), without the aid of complex analog circuitry or expensive digital to analog converters having relatively fast response characteristics.

The waveform diagram of FIG. 5 depicts relationships between various input and output signals associated with an embodiment of the present invention. In this example, the clock rate of the signal driving the bit stream provided by the analog assist circuit 130 is 250 kHz (or one bit consumed every 4 microseconds). The ramp bit sequence is 30 bits (six groups of 5 bits), and the total time of a resulting ramp is therefore 120 microseconds (4 microseconds per transmitted bit, times 30 bits) The FSK signal output stage 134 comprises a low pass filter. In an illustrative embodiment the output stage 134 comprises a two-stage RC low pass filter wherein a first (input stage) RC circuit has a time constant substantially greater than (e.g., multiple times) the exemplary clock cycle/bit consumption period of 4 microseconds. The substantially greater time constant of the first input stage prevents significant output signal changes over a single transmitted bit. The first RC circuit is placed in series with (i.e., cascaded with) a second (output stage) RC circuit that has a time constant that is substantially smaller than (e.g., almost half) the time constant of the first RC circuit. The actual time constants of the exemplary cascaded RC circuits potentially vary considerably based upon a variety of factors including: signal quality standards for the output stage 134 output signal, the rate at which bits (that correspond to a waveform segment) are consumed (i.e., the clock rate) by the analog assist circuit 130, the type/shape of waveform that is to be transmitted by the output stage 134, etc. In fact, in an embodiment of the invention, only a single stage RC circuit is present (at the expense of greater signal ripple in the output signal of output stage 134). However, in embodiments of the invention the (response) time constant of at least one RC circuit in the output stage 134 exceeds the bit hold period of the analog assist circuit 130.

A state machine value waveform 500 identifies an output associated with a present state of the state machine 300. As mentioned above, the state value drives selection of a particular one of the bit patterns (e.g., ramp, idle, neutral) as well as a counter value corresponding to the number of bits within the selected bit pattern. It is noted that this state machine is actually provided for an embodiment where distinct states are maintained for high/low transitions (ramps) as well as high and low idle states. Thus, rather than having three states, as shown in the example provided in FIGS. 4a and 4b, this state machine has five states.

A transmit enable waveform 510 corresponds to an exemplary signal transmitted on line 304 to the state machine 300. The transmit enable waveform 510 governs whether the analog assist circuit 130 will generate a neutral bit stream pattern (when disabled) or one of the non-neutral bit stream patterns (when enabled). An FSK square waveform 520 corresponds to an exemplary signal transmitted on line 128. The FSK square waveform 520 affects the state of the state machine 300 when the transmit enable waveform 510 is enabled.

A bit stream waveform 530, driven by the value of bits consumed by the analog assist circuit 130, corresponds to the signal transmitted via line 132 to the FSK signal output stage 134. The waveform corresponds to the sequence of bits accessed within the stored bit stream memories for selected states. Such bit steams take on a variety of waveforms in accordance with the many contemplated alternative embodiments of the present invention. Finally, an analog output waveform 540 identifies an exemplary output signal rendered on line 136 by the FSK signal output stage 134.

Having identified each of the waveforms depicted in FIG. 5, their relationships will now be described. Initially, the transmit enable waveform 510 is at the low/disabled level and the state machine waveform 500 indicates the state machine is in the "neutral state". The FSK square waveform 520 is irrelevant. The retrieved bit stream, as indicated by bit stream-driven waveform 530, is a balanced/alternating sequence of high and low bit values, and the analog output waveform 540 is at the neutral level.

At approximately 200 microseconds, the transmit enable waveform 510 goes to the enabled level, and the state machine waveform 500 indicates that it has entered a "ramp up" state (since the FSK square waveform 520 is currently at the high state). Since the transition is only a half transition (from neutral to high), only a latter portion of the ramp up bit stream, indicated by the bit stream-driven waveform 530 is provided. In this case, the "over drive" part of the bit stream is retrieved and passed in the signal on line 132 to the output stage 134. As a result, the analog output waveform 540 ramps up to the high level during a period of about 60 microseconds.

Next, the state machine (waveform 500) transitions to the high idle state, and remains in that state until the polarity of the FSK square waveform 520 changes to a low input at about 600 microseconds. It is noted that while in the high idle state, the bit stream-driven waveform 530 includes a minority of low bit values (e.g., 1 of 5 bits) such that the high output does not correspond to a 100 percent high duty cycle—which facilitates the over driving of the output during transitions between the logic levels. It is further noted that the small ripples in the output when a low bit is injected into a stream of high bits is an indication of the relatively slow response characteristic of the output stage 134 in comparison to the bit transmission rate. It is this relationship that facilitates the previously described shaping of the transitions between high and low output signal levels.

When the FSK square waveform 520 transitions from high to low (at approximately 600 microseconds) the state machine (waveform 500) transitions to a "ramp down" state. In this case the transition is a full transition. Thus, the bit stream-driven waveform 530 indicates an initial under drive portion followed by an over drive portion (all zeroes) that facilitates rendering a linearized ramp output as shown in the analog output waveform 540. The "ramp down" bit pattern, in the illustrative example, is the complement of the "ramp up" bit sequence.

Upon completion of the "ramp down" bit sequence at approximately 720 microseconds, the state machine (waveform 500) transitions to the low idle state, and the state machine remains in that state (and repeats the corresponding bit sequence) until the polarity of the FSK square waveform 520 changes to a high input at approximately 1000 microseconds. The low idle bit pattern, in the illustrative example, is the complement of the high idle bit pattern.

The remainder of the exemplary bit stream, for the most part, repeats the previously described waveforms and will not be repeated. However, it is noted that when the transmit enable signal (waveform 510) returns to a disabled level (at 2400 microseconds), the state machine (waveform 500) enters the neutral state. The bit stream driven signal on line 132 returns to the balanced/alternating (e.g., 50% duty cycle) bit pattern associated with the neutral state, and the analog output (waveform 540) returns to a neutral level.

In view of the many possible embodiments to which the principles of this invention may be applied, it should be recognized that the embodiments described herein with respect to the drawing figures are meant to be illustrative only and should not be taken as limiting the scope of invention. Furthermore, the illustrative steps may be modified, supplemented and/or reordered without deviating from the invention. Therefore, the invention as described herein contemplates all such embodiments as may come within the scope of the following claims and equivalents thereof.

What is claimed is:

1. A low power analog output circuit, for providing waveshaped output from a digital input signal, comprising:
   a raw digital data signal;
   sequential bit pattern selection logic that receives as an input, the raw digital data signal;
   a bit pattern storage, specifying bit stream sequences, that is accessible by the sequential bit pattern selection logic; and
   an output stage, driven by a digital input signal governed by a bit stream sequence selected from the bit pattern storage according to control signals issued by the sequential bit pattern selection logic, wherein the output stage comprises a low pass filter circuit having an effective time constant that is greater than a hold period for a single bit of the bit stream sequence that drives the digital input signal.

2. The output circuit of claim 1 wherein the bit pattern storage comprises a bit pattern sequence for producing:
a ramp between logical high and low levels.

3. The output circuit of claim 2 wherein the bit pattern sequence for producing a ramp between logical high and low levels includes at least an under-drive sub-sequence and an over-drive sub-sequence that counter non-linear response characteristics of the output stage.

4. The output circuit of claim 3 wherein the output stage comprises at least a resistor-capacitor low pass filter.

5. The output circuit of claim 4 wherein the resistor-capacitor low pass filter comprises a multi-stage resistor-capacitor circuit.

6. The output circuit of claim 5 wherein the multi-stage resistor-capacitor circuit is a two-stage resistor-capacitor low pass filter circuit.

7. The output circuit of claim 6 wherein a first stage of the two-stage resistor-capacitor circuit, that receives the digital input signal, has a time constant that is greater than the time constant of a second stage of the two-stage resistor-capacitor circuit.

8. The output circuit of claim 2 wherein the bit pattern storage specifies a bit pattern for a neutral output state.

9. The output circuit of claim 2 wherein analog signal levels for the logical high and logical low levels fall between maximum and minimum analog signal levels that the output stage is capable of producing at its output.

10. The output circuit of claim 2 wherein the bit pattern storage and output stage are adapted to render a HART compliant FSK signal.

11. The output circuit of claim 1 wherein the sequential bit pattern selection logic comprises a state machine.

12. The output circuit of claim 11 wherein the state machine includes at least a ramp state and an idle state.

13. The output circuit of claim 12 wherein the state machine also includes a neutral state associated with a disabled transmission output mode of operation.

14. The output circuit of claim 1 wherein the hold period for a single bit of the bit stream sequence is at least one microsecond.

15. The output circuit of claim 14 wherein the hold period for a single bit of the bit stream sequence is at least 2 microseconds.

16. The output circuit of claim 14 wherein the bit period for transmitting a single bit of the bit stream sequence is about 4 microseconds.

17. The output circuit of claim 1 wherein the ratio of the low pass filter effective time constant to the hold period for a single bit of the bit stream sequence is at least two.

18. The output circuit of claim 1 wherein the ratio of the low pass filter effective time constant to the hold period for a single bit of the bit stream sequence is at least five.

19. A process variable transmitter comprising:
a process variable sensor;
a processing unit; and
an output circuit comprising:
a raw digital data signal;
sequential bit pattern selection logic that receives as an input, the raw digital data signal;
a bit pattern storage, specifying bit stream sequences, that is accessible by the sequential bit pattern selection logic; and
an output stage, driven by a digital input signal governed by a bit stream sequence selected from the bit pattern storage according to control signals issued by the sequential bit pattern selection logic, wherein the output stage comprises a low pass filter circuit having an effective time constant that is greater than a hold period for a single bit of the bit stream sequence that drives the digital input signal.

20. The transmitter of claim 19 wherein the bit pattern storage comprises a bit pattern sequence for producing:
a ramp between logical high and low levels.

21. The output circuit of claim 20 wherein the bit pattern sequence for producing a ramp between logical high and low levels includes at least an under-drive sub-sequence and an over-drive sub-sequence that counter non-linear response characteristics of the output stage.

22. The output circuit of claim 21 wherein the output stage comprises at least a resistor-capacitor low pass filter.

23. The output circuit of claim 22 wherein the resistor-capacitor low pass filter comprises a multi-stage resistor-capacitor circuit.

24. The output circuit of claim 20 wherein analog signal levels for the logical high and logical low levels fall between maximum and minimum analog signal levels that the output stage is capable of producing at its output.

25. The output circuit of claim 20 wherein the bit pattern storage and output stage are adapted to render a HART compliant FSK signal.

26. A method for generating an analog output signal via an output stage driven by a stream of binary logic data signals comprising:
receiving a raw binary digital data input signal by a state machine;
selecting, by the state machine, one of a set of stored bit stream sequences; and
sequentially transmitting the selected bit stream sequence to an output stage, wherein each output bit is held for a period of time, and wherein the output stage comprises a low pass filter circuit having an effective time constant that is greater than the period of time.

* * * * *